UNITED STATES PATENT OFFICE.

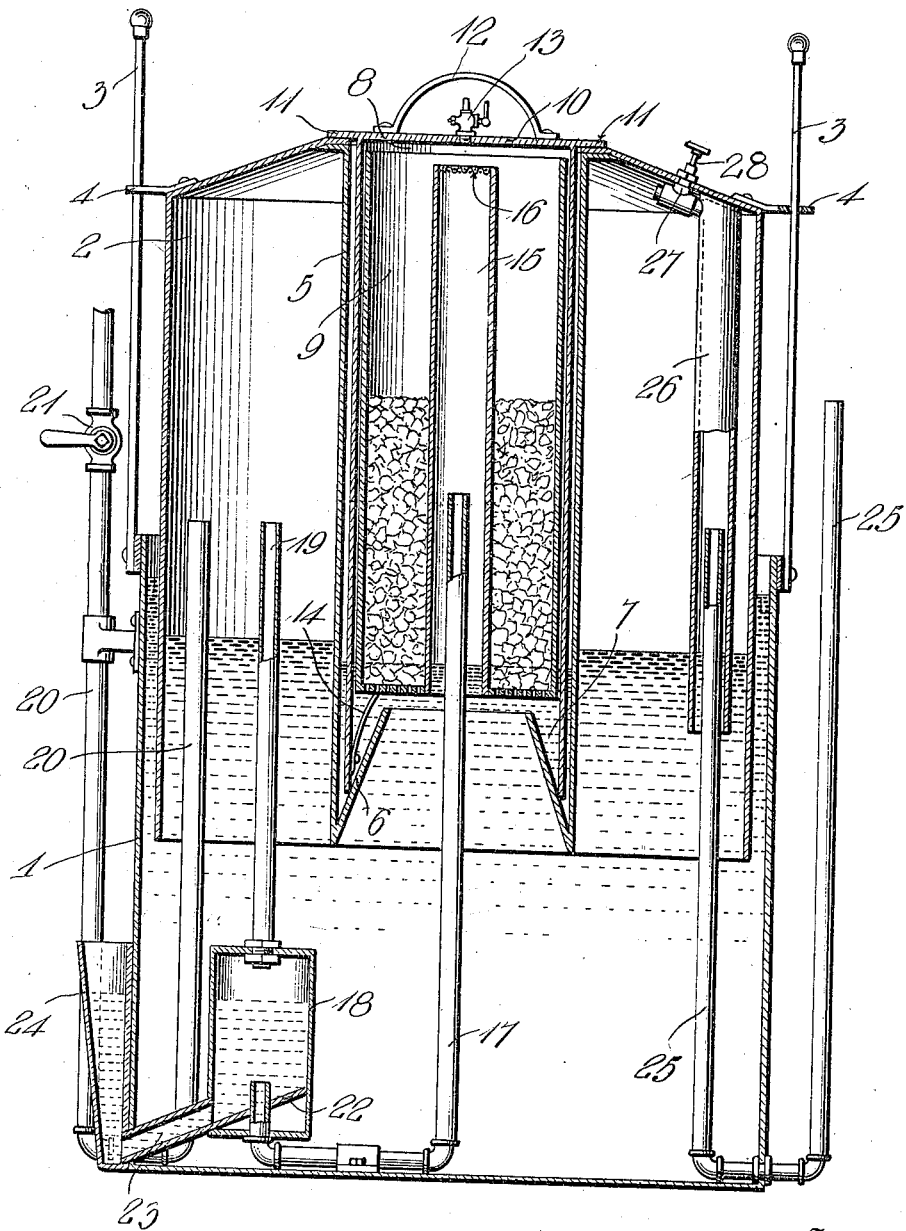

ERNEST W. DUNHAM, OF TOPEKA, KANSAS.

ACETYLENE-GAS GENERATOR.

1,013,752.

Specification of Letters Patent.

Patented Jan. 2, 1912.

Application filed January 30, 1911. Serial No. 605,510.

*To all whom it may concern:*

Be it known that I, ERNEST W. DUNHAM, a citizen of the United States, residing at Topeka, in the county of Shawnee and State of Kansas, have invented certain new and useful Improvements in Acetylene-Gas Generators; and I do declare the following to be a full, clear, and exact description of the invention, such as will enable others skilled in the art to which it appertains to make and use the same.

This invention relates to improvements in gas generators.

The object of the invention is to provide a generator of this character with a wash box or purifier which will be simple, strong and durable in construction, efficient and reliable in operation and well adapted to the purpose for which it is designed.

With this object in view, the invention consists of certain novel features of construction, combination and arrangement of parts as will be more fully described and particularly pointed out in the appended claim.

The drawing is a vertical sectional view of a gas-generator constructed in accordance with the invention.

In the embodiment of the invention I provide an outer water tank 1 in which is arranged a gas holder or bell 2 the lower end of which projects into the water of the tank and is thus sealed. The tank 1 is provided on its upper edge with suitable upwardly projecting guide standards 3 which are slidably engaged by apertured ears or lugs 4 arranged on the upper end of the bell 2 whereby the latter is guided in its up and down movement and prevented from binding against the sides of the tank 1.

Arranged in the center of the bell 2 is a downwardly projecting tubular casing 5 extending to the level of the lower end of the bell. In the lower end of the casing 5 is arranged an inwardly inclined upwardly projecting flange or wall 6 which forms a substantially V-shaped annular receptacle 7 adapted to contain water whereby a water seal is provided in the lower end of the casing. Removably engaged with the casing 5 is another cylindrical casing 8 adapted to receive a carbid basket or holder 9 provided near its lower end with perforations through which water may enter to the carbid when the bell is lowered. The lower end of the casing 8 projects into the water seal 7 arranged in the lower end of the casing 5. The upper end of the casing 8 is closed by a cover 10 the outer edge of which projects radially and forms a flange 11 adapted to rest upon the upper end of the casing 5 thereby tightly closing the latter. The casing 8 is provided on its upper end with a handle 12 whereby it may be removed from the casing 5. In the upper end of the casing 8 is also preferably arranged an escape valve 13 which may be opened when desired to permit the air to escape when charging the generator.

The carbid basket or holder 9 is supported in the casing 8 above the lower end thereof by a flat spring 14 arranged on the inner side of the casing 8 as shown. In the center of the basket or holder 9 is arranged an upwardly projecting tube 15 which forms an outlet for the gas generated in the casing 8. The tube 15 opens through the bottom of the basket 9 and extends from said bottom to near the upper end of the same and on the upper end of the tube is arranged a wire netting cap or covering 16 preventing the entrance of any foreign matter into the tube.

When the bell 2 lowers in the tank 1 to a sufficient extent to bring the lower end of the casing 5 and the carbid basket 9 into engagement with the water the latter will flow through the perforations in the basket and on coming into contact with the carbid will generate gas which rises into the upper portion of the casing 8 and enters the upper end of the discharge tube 15. From the tube 15 the gas passes downwardly through a pipe 17 and is discharged therefrom into a wash box arranged in the lower portion of the tank 1. The box 18 is partially filled with water through which the gas bubbles up from the connected lower end of the pipe 17. To the upper end of the wash box 18 is connected a pipe 19 extending upwardly into the bell 2 to approximately the height of the tank 1 whereby the gas from the wash box 18 is discharged into the upper portion of the bell thus causing the latter to rise in the outer tank 1. The gas after entering the upper portion of the bell 2 passes therefrom through the gas discharge pipe 20 the inner end of which extends upwardly into the bell as shown. The discharge pipe 20 passes through the side of the tank 1 and is extended upwardly along the outer side of the tank and provided with a valved coupling 21 to which is adapted to be connected the service pipe (not shown).

The wash box 18 is provided with an inclined bottom or lower end 22 and has connected to one side at the lower end of said inclined bottom an inclined discharge tube 23 which opens through the adjacent side of the tank 1 and is connected to the lower end of an overflow spout 24 secured to the outer side of the tank 1. The gas in bubbling up through the water in the wash box is thoroughly cleansed of all impurities before passing into the gas bell. The impurities thus removed from the gas settle upon the inclined bottom of the wash box and are conducted therefrom through the tube 23 to the overflow spout 24, from which it may be removed with a suitable scoop or spoon, or otherwise, if desired.

In the opposite side of the tank 1 from the discharge pipes is arranged a relief pipe 25 the inner end of which extends up into the bell 2 to the level of the outer tank 1, while the outer end thereof extends upwardly and is connected with a discharge pipe leading to the atmosphere. Slidably engaged with the inner portion of the spout or relief pipe 25 is a trap cylinder 26 the upper end of which is closed and secured to the under side of the top bell whereby said cylinder moves up and down with the bell. With a normal volume of gas the bell will not rise sufficiently high in the tank 1 to cause the lower end of the cylinder 26 to rise above the water level in the tank 1 so that the gas in the bell cannot enter said cylinder. If the gas should accumulate in the bell more rapidly than it is used or carried off through the discharge pipe 20 and the bell be thus forced upwardly a sufficient distance to bring the inner end of the trap cylinder 26 above the water line in the tank 1, the gas in the bell will escape through the trap cylinder 26 and into the relief or safety pipe 25 and from thence to the atmosphere thereby preventing the danger of the bell being forced out of the tank by the pressure of the gas.

In the upper portion of the bell 2 is arranged a relief valve 27, said valve connecting the upper portion of the bell with the upper end of the cylinder 26 whereby the gas in the upper portion of the bell may be let out through the safety discharge pipe 25 when it is desired to remove the bell from the tank. The stem 28 of the valve projects through the top of the bell as shown.

By constructing and arranging the gas generating mechanism as herein shown and described it will be seen that the casing 8 may be removed from the casing 5 and the carbid receptacle or basket then removed from the chamber and the carbid therein replenished without interfering with the gas in the bell or with the operation of the generator. When the casing 8 and carbid receptacle have been removed from the casing 5 the water in the wash box will prevent any gas from the bell passing back through the pipe 17, said wash box thus forming a trap. When the casing 8 is in place in the casing 5 with the lower end of the former in the water seal 7 in the lower end of the latter, the seal will prevent any gas from passing from the casing 8 into the casing 5.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention what I claim is:

A gas apparatus comprising a gasometer, a movable bell forming a part of the latter and adapted to receive the gas generated in the gasometer, a tubular casing secured to and depending from the top of the bell, a carbid holder removably located in said casing, a discharge tube projecting from the bottom of the carbid holder, a purifier located in the bottom of the gasometer and immersed in the water contained therein, said purifier having an inclined bottom, an inclined tube leading therefrom and arranged on a line with the said bottom, a spout located on the outside of the gasometer and in communication with the pipe leading from the purifier, a pipe fixedly mounted in the gasometer and having an upstanding portion adapted for telescoping engagement with the tube of the carbid holder, the opposite end of the pipe entering the bottom of the purifier, a pipe leading from the top of the latter and extending above the water contained within the gasometer, and a relief pipe for the apparatus thus constructed.

In testimony whereof I have hereunto set my hand in presence of two subscribing witnesses.

ERNEST W. DUNHAM.

Witnesses:
J. W. SHELDON,
DAVID BROWN.

Copies of this patent may be obtained for five cents each, by addressing the "Commissioner of Patents, Washington, D. C."